United States Patent Office 3,560,416
Patented Feb. 2, 1971

3,560,416
HYDROPHILIC POLYURETHANE FOAMS
Joerg Sambeth and Alexis Archipoff, Carouge, Geneva, Switzerland, and Jean-Pierre Godechot, Paris, France, assignors to Elekal, Paris, France
No Drawing. Continuation-in-part of application Ser. No. 597,236, Nov. 28, 1966. This application June 27, 1969, Ser. No. 837,365
Int. Cl. C08g 22/44
U.S. Cl. 260—2.5                               6 Claims

ABSTRACT OF THE DISCLOSURE

This specification discloses hydrophilic polyurethane foams. The foams are prepared by reacting a morpholine derivative containing an active hydrogen atom with the ingredients conventionally used to prepare polyurethane foams.

CROSS REFERENCE TO RELATED APPLICATIONS

This is a continuation-in-part of Application Serial No. 597,236, filed November 28, 1966, now abandoned.

BACKGROUND OF THE INVENTION

Field of the invention

The invention relates to hydrophilic polyurethane foams.

Description of the prior art

As is known, polyurethane foams generally consist of the reaction products of at least one organic polyisocyanate with at least one polyester or polyether based polyol and water. Such polyurethane foams however have a distinctly hydrophobic nature which thereby restricts, inter alia, their application in industrial and household uses for sponging purposes, since they cannot, by mere contact, sponge a moist surface. The present invention overcomes this problem by providing hydrophilic foams.

In U.S. Pat. 2,993,869 there are disclosed polyurethane foams which comprise the reaction products of a polyol, a polyisocyanate and water wherein the reaction is catalyzed by tertiary amines of which N-alkyl-morpholines are exemplary. It is clear however that in this patent, the above-mentioned morpholine compound is a catalyst and not a component of the foam since the patentee intends to "eliminate any catalyst which might remain as vapor in the foamed material," (column 2, lines 47–49).

SUMMARY OF THE INVENTION

The object of the present invention is to provide novel polyurethane foams which are distinctly hydrophilic in nature.

In summary, the foam which is the subject of the invention comprises the reaction product of (1) at least one organic polyisocyanate, (2) at least one polyester or polyether based polyol, (3) water and (4) at least one morpholine derivative of the formula:

wherein R is a monovalent functional group having at least one active hydrogen atom and R' is a divalent functional group having at least one active hydrogen atom.

DETAILED DESCRIPTION

The hydrophilic polyurethane foams provided by the invention comprise the reaction product of all the following reactants: at least one organic polyisocyanate, at least one polyester or polyether based polyol, water and at least one morpholine derivative of the formula:

wherein R is a monovalent functional group having at least one active hydrogen atom and R' is a divalent functional group having at least one active hydrogen atom.

The meaning of the term "active hydrogen atom" when used in this specification or any other describing a polyurethane foam or a process for making same is quite clear and well known to those skilled in the art.

This term is universally used in the art for a hydrogen atom capable of reacting with an isocyanato group, and more generally for a hydrogen atom that displays activity according to the Zerewitinoff test [described by Kohler in Journal of American Chemical Society 49, p. 318 (1927)]. In addition, the term "active hydrogen atoms" used in the present art refers to hydrogen atoms that may be substituted by alkaline metal atoms.

The term "active hydrogen compound" is used and explained in the above noted Gmitter Patent (column 3, line 6). More generally, the same term is used in other patents on polyurethane foams, for instance in U.S. Pat. No. 2,920,983 (Bugosh), column 2, lines 47 to 51.

A more fundamental explanation for the meaning of this term is found in the textbook, "Polyurethanes" (Part 1 Chemistry), J. H. Saunders and K. C. Frisch, Interscience Publishers, New York and London (1962), pages 63 and 64.

The purpose of the hydrophilic morpholine derivative is to react with the polyisocyanate through the active hydrogen contained in the functional group, while the morpholine group remains free. Thereby, the foam product has the desired hydrophilic properties.

To this end, use will be made of at least one derivative of the formulae:

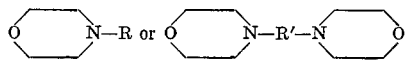

wherein R and R' are the functional group. For example, R may be any one of —CH$_2$OH, —NH$_2$, —CONH$_2$ —NH—CO—NH$_2$, —CH$_2$—CH$_2$OH, —(CH$_2$)$_3$—NH$_2$, —CH$_2$—CHOH—CH$_3$ or —NH—CO—C$_6$H$_5$; and R' may be any one of —CHOH—, —CH$_2$CHOH—CH$_2$— or —(CH$_2$)$_3$—NH—(CH$_2$)$_3$—.

Thus, use may be made of any one of the following hydrophilic morpholine derivatives, in all of which, the functional groups are bonded to the N atoms: 1,3-dimorpholyl-2-propanol, N-β-hydroxyethylmorpholine, 4-[3-hydroxy-1,2,3,4-tetrahydro-2 - naphthyl] - morpholine, 4-amidomorpholine, 4 - aminomorpholine, 4 - benzamido morpholine and 4-ureido-morpholine.

The hydrophilic polyurethane foams are produced by reacting at least one polyisocyanate with at least one polyester or polyether based polyol and at least one of the abovementioned morpholine derivatives at ambient temperature and in the presence of water, a catalyst and at least one surface active agent. The materials are stirred, poured into a mold and left to foam.

As for the catalysts, use is preferably made of those catalysts which are resorted to in the known methods of making polyurethane foams. As an example of such a catalyst, there is stannous octoate. The same applies to the surface active agents for stabilizing the foam, i.e., those as are conventionally used in preparing polyurethane foams are used in the present invention. For this purpose, use can be made of silicone oils consisting of polyalkylene oxide-polyorganosiloxane copolymers. Moreover, dimethylsilicones can be used by way of macrostructural agents for imparting to the foams the appearance of natural sponge.

The above-described method for producing the foams of the present invention may be practiced as follows:

Example 1

An intimate mixture of:

| | Parts |
|---|---|
| Polypropylene-glycol (molecular weight: 2100) | 95 |
| 1,3-dimorpholyl-2-propanol | 5 |
| Total water | 3.5 |
| Tolylene diisocyanate, TDI index 110 | |
| Silicone oil | 2.5 |
| Triethylene diamine | 0.005 |
| Stannous octoate | 0.15 | is prepared by stirring at ambient temperature and the mixture is then poured into a mold and left to foam.

The foam thus produced has outstanding hydrophilic properties which were ascertained by:

(1) A conventional method which consists in determining the wetting time of a sponge: 2 to 3 seconds for a sponge of usual size;

(2) A conventional method which consists in measuring the wiping properties of a sponge: the wiping efficiency reaches and exceeds 85%.

Example 2

The procedure is the same as in Example 1, but instead of 5 parts of 1,3-dimorpholyl-2-propanol, 10 parts of N-β-hydroxyethylmorpholine are used.

Example 3

The procedure is the same as in Example 1, but instead of 5 parts of 1,3-dimorpholyl-2-propanol, 10 parts of N-amino-propylmorpholine are used.

Example 4

The procedure is the same as in Example 1, but instead of 5 parts of 1,3-dimorpholyl-2-propanol, 5 parts of 3,3'-dimorpholyl dipropylamine are used.

Example 5

The procedure is the same as in Example 1, but instead of 5 parts of 1,3-dimorpholyl-2-propanol, 10 parts of N-β-hydroxypropylmorpholine are used.

The hydrophilic properties of the foams produced in Examples 2–5 were determined in the same manner as for the product of Example 1 and similar results are observed.

What is claimed is:

1. A hydrophilic polyurethane foam prepared by reacting, in the presence of stannous octoate as a catalyst and at least one surface active agent, (i) at least one organic polyisocyanate, (ii) at least one polyol selected from the group consisting of polyesters and polyethers, (iii) water and (iv) at least one morpholine derivative of the formula:

wherein R is a monovalent functional group having at least one active hydrogen atom and R' is a divalent functional group having at least one active hydrogen atom.

2. A hydrophilic polyurethane foam as claimed in claim 1 wherein the organic polyisocyanate is tolylene diisocyanate.

3. A hydrophilic polyurethane foam as claimed in claim 1 wherein the polyol is polypropylene glycol.

4. A hydrophilic polyurethane foam as claimed in claim 1 wherein the surface active agent is a silicone oil consisting of a polyalkylene oxide-polyorganosiloxane copolymer.

5. A hydrophilic polyurethane foam as claimed in claim 1 which further comprises dimethylsilicones.

6. A hydrophilic polyurethane foam as claimed in claim 1 wherein the morpholine derivative has the formula:

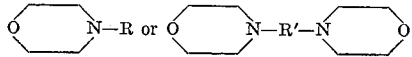

wherein R is —$CH_2OH$, —$CH_2CH_2OH$, —$NH_2$,

—$CONH_2$,

—$NHCONH_2$, —$(CH_2)_3$—$NH_2$, —$CH_2$—$CHOH$—$CH_3$ or —$NH$—$CO$—$C_6H_5$; and R' is —$CHOH$—, —$CH_2$—$CHOH$—$CH_2$— or —$(CH_2)_3$—$NH$—$(CH_2)_3$—.

References Cited

UNITED STATES PATENTS 2,993,869  7/1961  Gmitter et al. _____ 260—2.5

DONALD E. CZAJA, Primary Examiner

M. J. WELSH, Assistant Examiner